United States Patent Office 3,490,130
Patented Jan. 20, 1970

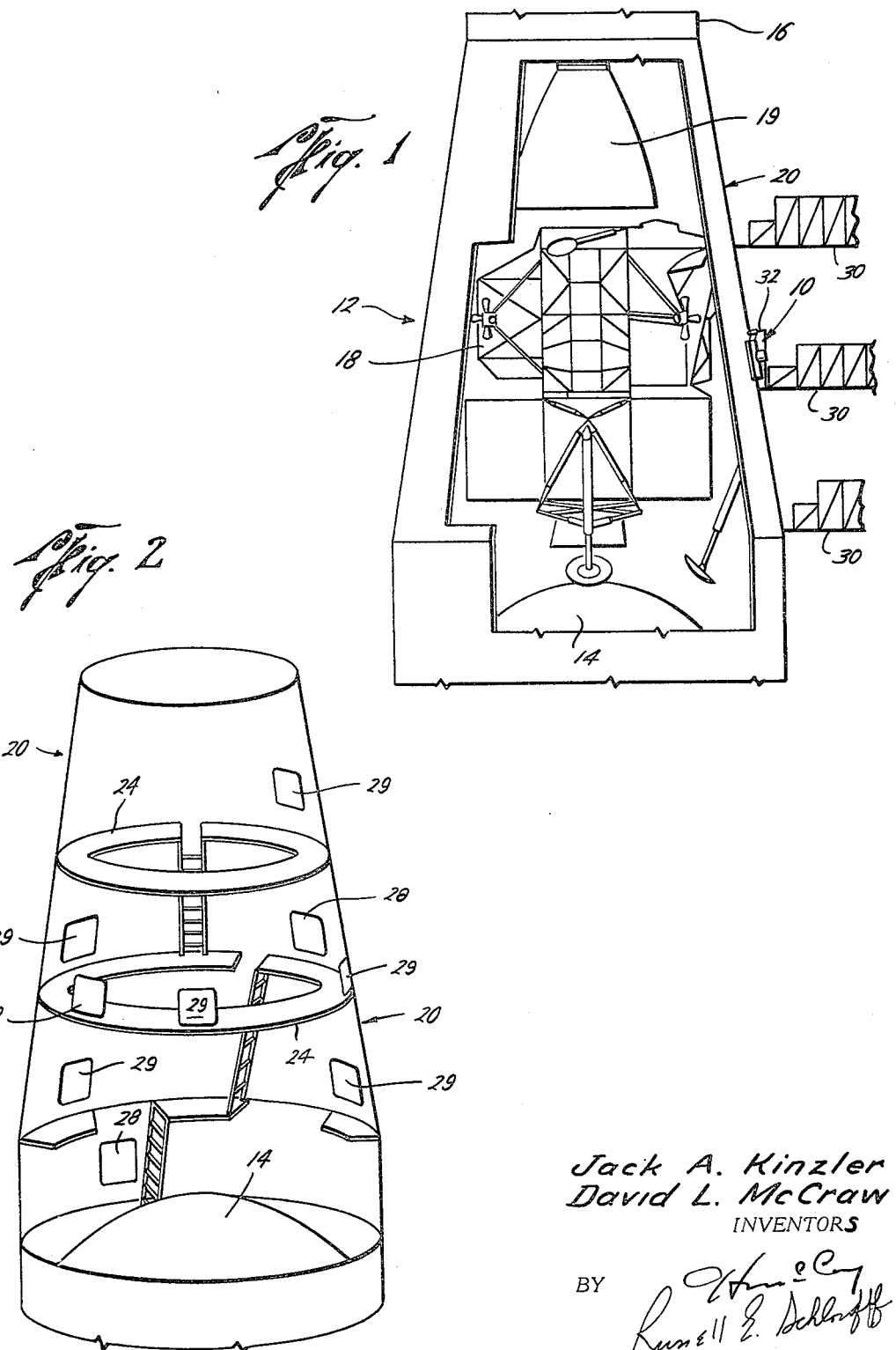
Jack A. Kinzler
David L. McCraw
INVENTORS

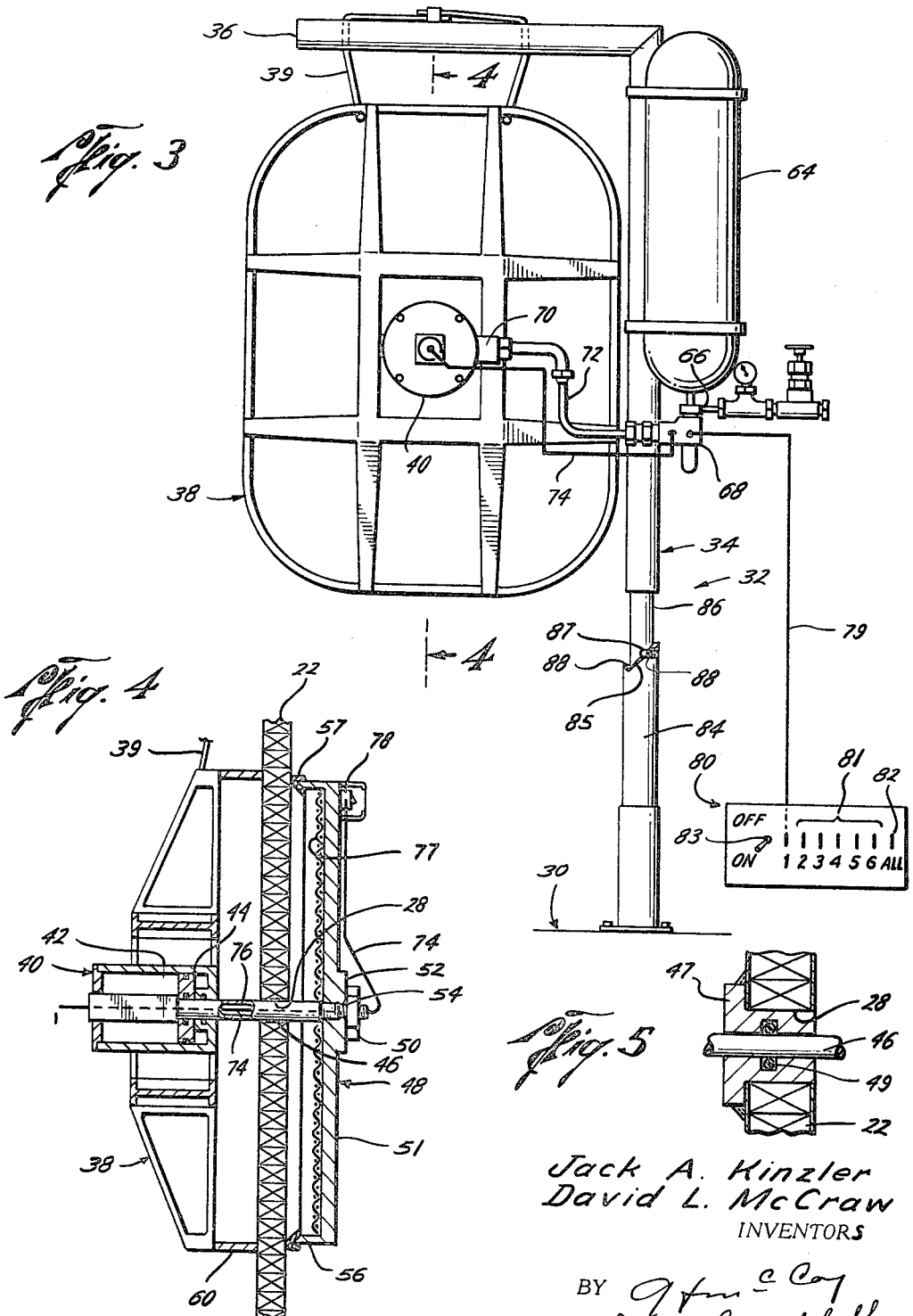

3,490,130
EMERGENCY ESCAPE SYSTEM
Jack A. Kinzler, Seabrook, and David L. McCraw,
Friendswood, Tex., assignors to the United States
of America as represented by the Administrator
of the National Aeronautics and Space Administration
Filed Apr. 3, 1969, Ser. No. 812,999
Int. Cl. B23p 17/00, 19/04
U.S. Cl. 29—400                              15 Claims

ABSTRACT OF THE DISCLOSURE

A system for providing emergency, man-sized passageways in the walls of an enclosure. The enclosure walls are provided with one or more small holes at strategic locations. A die member containing a draw bar assembly is attached to a pivotal support assembly located on the exterior surface adjacent each small hole. The shaft of the draw bar assembly extends through the hole and a male pouch member is attached thereto. Interior and exterior controls are provided to energize a power source which actuates the draw bar assembly. Actuation results in the instantaneous forming of a man-sized passageway. The cutout wall section and the die and punch assembly are moved away from the passageway by the pivotal support assembly.

ORIGIN OF THE INVENTION

The invention decribed herein was made by employees of the United States Government and may be manufactured and used by or for the Government or for governmental purposes and without payment of any royalties thereon or therefor.

BACKGROUND OF THE INVENTION

This invention relates to a system for instantaneously providing emergency, man-sized passageways in the walls of an enclosure.

In various phases of aerospace, marine, and medical research and development, non-sealed and sealed enclosures are utilized in laboratory-like conditions for assembling, demonstrating, testing, servicing, and verifying various systems and subsystems. For example: in the Apollo program, the spacecraft lunar module adapter (SLA) is a structural interstage surrounding the lunar module which is located between the launch vehicle and the spacecraft. The SLA is formed of honeycombed structural panels and defines an interior working space several stories in height. Although the SLA does not form a sealed compartment, it is mandatory that its structural integrity be maintained. Permanent man-sized ingress-egress hatches in the SLA structure are held to a minimum since the necessary structural additions to reinforce such a hatch will result in increased weight.

In carrying out systems verification tests and fueling operations, it is necessary for workmen and technicians to perform numerous tasks within the confines of the SLA. During such time the men are subjected to a variety of potentially hazardous situations such as may arise if fire should break out or toxic fumes be emitted within the working enclosure. Although it may readily be recognized that prompt if not immediate exit from the interior of the SLA is called for in order to avoid serious injury or loss of life, such is not easily accomplished presently because of the intricate multi-level framework in which the men operate. Despite the fact that the SLA may have a plurality of ingress-egress hatches, such hatches do not exist at every level, and therefore if an emergency should arise, workmen within the SLA could escape only by climbing up or down to the nearest ingress-egress hatch. This requires invaluable time and may, under some circumstances, be impossible because of blocked passageways.

SUMMARY OF THE INVENTION

In an effort to obviate the problem described above, it is a primary object of the invention to provide a completely self-contained system for instantaneously cutting man-sized passageways through the wall of an enclosure such as the SLA so as to permit the immediate exit of personnel therein in the event of an emergency.

It is another object to provide a system which permits a multiplicity of exits to be selectively formed as required without impacting the structural integrity or causing any weight penalties which would result if permanent exits were used.

Another object is to provide a reliable, low cost, egress method for the instantaneous removal of personnel from a enclosure.

A further object is the provision for an improved punch and die egress cutter attached to an enclosure by a common draw bar extending through a small hole in the wall of the enclosure and supported exteriorly by a pivotal support assembly so that upon actuation the portion of the wall being removed and which forms a man-sized passageway will be swung out of the way.

A still further object is to provide an emergency escape system which may either be actuated internally or externally from a remote location.

In order to accomplish the above and other objects which will be apparent to those skilled in the art, the wall of the enclosure is provided with one or more strategically positioned small holes. A pivotal support assembly is located on the exterior of the enclosure adjacent each hole. A female die member containing a draw bar assembly is suspended from the pivotal support member and positioned against the exterior surface of the wall with the shaft of the draw bar extending through the hole. A male punch member is positioned against the interior wall and attached to the draw bar shaft. A power source is connected to the draw bar assembly, and interior and exterior controls are provided for actuating the power source. Upon actuation, the punch and die assembly instantaneously forms a man-sized passageway and the cutout portion of the wall forming the man-sized passageway together with the punch and die assembly, are automatically moved clear of the passageway permitting immediate easy exit of personnel from within or entry of rescue workers.

If no emergency arises, after internal operations are completed the system can be removed and the small hole easily patched, whereby the integrity of the structure will remain intact.

BRIEF DESCRIPTION OF THE DRAWINGS

FIG. 1 is an elevational view partially in broken section illustrating the upper portion of the Apollo spacecraft-launch vehicle assembly utilizing the escape system of the present invention.

FIG. 2 is a diagrammatic view showing the location of permanent hatches and the position of the punch and die assemblies of the present invention.

FIG. 3 is an elevation view of the emergency egress cutter when viewed on the outer wall of the enclosure.

FIG. 4 is a sectional view along 4—4 of FIG. 3.

FIG. 5 is a fragmentary sectional view illustrating an alternative arrangement.

DETAILED DESCRIPTION OF PREFERRED EMBODIMENT

Referring now in detail to that embodiment of the invention illustrated in the accompanying drawings, it can be seen that escape system 10 is being utilized in connection with an Apollo spacecraft launch vehicle assembly 12. Located between the top of the Saturn V rocket 14 and the service module of the Apollo spacecraft 16 is the lunar module 18. Surrounding lunar module 18 and the expansion nozzle 19 of the service propulsion engine is the spacecraft lunar module adapter (SLA) 20. The SLA is formed of honeycombed structural panels 22. While the SLA is not a sealed compartment, it is mandatory that its structural integrity be maintained. The interior of the SLA defines a working space several stories in height, and there are numerous catwalks 24 positioned along its vertical axis providing access to the various levels. In carrying out systems verification tests and other operations, it is necessary for workmen to perform numerous tasks within the confines of the SLA. Accordingly, the SLA is provided with one or more permanent man-sized hatches 26 to provide ingress and egress to the interior of the SLA. As can be seen, hatches 26 are not at every catwalk level. Due to the congested interior, movement from one level to another requires considerable time. During the various operations performed within the SLA, there is the hazard of fire or the escape of toxic fumes. In such cases it is desirable to provide a speedy exit for any personnel within the SLA. Emergency escape system 10 provides for the selective forming of such exits in the event of an emergency without destroying the structural integrity of the SLA.

In order to incorporate the present escape system, it is only necessary to make small holes 28, approximately an inch and a half in diameter, in the honeycombed panels 22. These holes 28 are strategically located about the walls of the SLA, preferably at least one at every catwalk level and increased numbers where activity dictates (see FIG. 3 which shows the location of permanent hatches 26 and the location of possible emergency passageways 29 in the SLA).

Surrounding the outside of the SLA is a multiplicity of scaffolding 30. Positioned on the scaffolding adjacent each hole 28 is a pivotal support assembly 32 having a segmented post 34 which is attached to the floor of scaffolding 30 (see FIG. 3). Pivotal support assembly 32 has a horizontally extending arm 36 from which is suspended a female die member 38 by cable 39. The die member 38 is provided with a draw bar assembly 40 which includes a cylinder 42 in which is disposed a sealed piston 44. Extending normally to the surface of the piston along the axis of the cylinder is draw bar shaft 46 which is telescoped through small hole 28. If the enclosure is sealed, the hole 28 may be made slightly larger and a bushing 47 may be welded or bonded into the wall. Bushing 47 contains an O-ring seal 49 which provides a seal with draw bar shaft 46 (see FIG. 5). Attached to the outer end of the draw bar is the male punch member 48, which is positioned against the interior wall of the SLA. The end of shaft 46 may be threaded and the punch member secured thereto shaft by a large hand-engageable nut 50.

The punch member may be of generally rectangular configuration and is of such size to allow the easy passage of personnel from or into the enclosure. Naturally, other shapes such as round may be used. To lighten the weight of the punch member so it can easily be transported within the SLA, punch member 48 may be formed of a plate having a plurality of cutout portions. The remaining structure forms reinforcing ribs 51 and a central hub portion 52 having aperture 54 through which the end of the draw bar 46 extends. A knife edge 56 extends around the peripheral edge of the punch member 48. To prevent scarring the interior surface a guard 57 which may be formed of rubber may be placed over knife edge 56. The female die member 38 has a cutting edge 60 which cooperates with cutting edge 56 of the male punch member. The cutting edge 60 may be made of steel rule die stock having a square peripheral edge. With such a construction it has been found that the punch and die assembly cuts a clean man-sized passageway through the honeycombed structure forming the SLA panels. It has been found that the cutout passageway can be replaced without irreparable damage to the structural integrity of the SLA.

Attached to post 34 is a container 64 of pressurized pneumatic fluid which acts as the power source for the draw bar assembly. If desired, other power source such as a pyrotechnic device may be utilized. Container 64 has an outlet 66 to which is attached an electrically operated solenoid valve assembly 68. The draw bar cylinder 42 is provided with an inlet port 70. Extending between the inlet port and solenoid valve 68 is a high pressure hose 72. Upon actuation of solenoid valve 68, gas will flow from the container into the cylinder of the draw bar assembly causing the male punch member to be pulled through the honeycombed panel thereby forming a man-sized passageway in the wall of the SLA. It has been found that such action is instantaneous, the man-sized passageway being formed in approximately one millisecond.

In order to actuate the valve member, controls are located interiorally of the SLA and also externally thereof. An electrical lead 74 may extend from the valve through a longitudinal passage 76 in the draw bar to the interior of the SLA and then extend to a guarded, spring loaded off, toggle switch 78 which may be located on the male punch member. Accordingly, personnel within the SLA may operate the emergency system any time the necessity arises.

As mentioned, the forming of the passageway is instantaneous, the reaction causes the cutout portion to move out of the formed passageway, accordingly, the male die member may be provided with a screen 77 so that the person operating the system will not grab onto the ribs of the male punch member 51.

In addition, electrical lead 79 may run from electrically operated solenoid valve assembly 68 to a central power control panel 80 located exteriorly of the SLA. Therefore, the emergency escape system may be operated from a remote location to permit immediate ingress of rescue workers. The central power control panel may be constructed so that any single punch and die assembly may be actuated by individual switches 81 or so that a plurality can be operated at one time by an all-fire control 82. Moreover, the control panel may be provided with on and off switch 83 which prevents inadvertent actuation during periods when the system should not be actuated.

In order that the punch and die assembly will swing out of the way after actuation, pivotal support assembly 32 is in the form of a davit. Vertical member may be segmented having a lower portion 84 provided with a cam surface 85. A reduced upper shaft portion 86 telescopes into the lower portion of the post. A pin 87 is fixedly connected to the reduced shaft portion. The cam surface has notches 88 in which the pin is normally held. Upon actuation, the torque from the force of the male punch member reacting with the female die member will cause the pivotal arm to swing outward. Cam surface will prevent it from swinging back, therefore, the man-sized passageway will be instantaneously available for emergency use.

As can be seen from the foregoing, novel emergency escape system 10 provides a means whereby personnel working within the confines of an enclosure are provided with an immediate emergency exit. The system can be operated either from the interior by the personnel therein or from a monitored remote exterior location which permits the immediate entry of rescue workers. In the event that the emergency system does not have to be used, the small holes which are cut in the wall of the enclosure can be easily patched, restoring the structural integrity of the enclosure. In the event that the emergency system is used, the punch and die which cut out man-sized passageway provides a rather smooth passageway through the honeycombed structure which can easily be replaced.

What we claim is:

1. A system for providing emergency man-sized passageways for an enclosure comprising:
   providing at least one small hole in the wall of the enclosure;
   a support assembly positioned on the exterior side of the enclosure adjacent each hole in the wall;
   a female die member having a draw bar assembly containing a draw bar shaft, the die member secured to the support assembly and positioned against the exterior side of the enclosure with the draw bar shaft extending through the hole;
   a male punch member positioned against the interior side of the enclosure in cooperative relationship with the die member and secured to the end for the draw bar shaft;
   a power source for the draw bar assembly; and
   means to actuate the power source.

2. The system specified in claim 1 characterized in that the support assembly is pivotal so that upon actuation of the draw bar assembly the punch and die members together with the cutout section of the wall will automatically swing free of the passageway.

3. The system specified in claim 2 characterized in that the pivotal support assembly has a segmented vertical post provided with a pin and cam arrangement whereby, upon pivoting out, it locks in such position.

4. The system specified in claim 1 characterized in that there are internal controls to provide operation by personnel within the enclosure and exterior controls to provide operation by personnel outside the enclosure.

5. The system specified in claim 1 characterized in that there are a plurality of punch and die devices about the enclosure, and the exterior control is arranged to permit operation of any one or all of the punch and die devices.

6. The system specified in claim 1 characterized in that the power source is comprised of a container of compressed pneumatic fluid attached to the support assembly, an electrically operated solenoid valve is attached to the container, and a high pressure hose extends from the container to the draw bar assembly which is a piston and cylinder arrangement.

7. The system specified in claim 6 characterized in that there is a longitudinal passage through the draw bar shaft and an electrical lead extends from the electrically operated solenoid valve to a switch located on the male punch member.

8. The system specified in claim 1 characterized in that the punch member has a peripheral cutting edge provided with guard means to prevent scarring the interior surface of the enclosure.

9. The system specified in claim 1 characterized in that the punch member is structurally constructed of a peripheral edge and strengthening ribs and hub section so that the weight of the punch member is minimized whereby it is easily transportable within the enclosure.

10. The system specified in claim 9 characterized in that there is a screen over the face of the punch member to present grabbing of the ribs thereof.

11. The system specified in claim 1 characterized in that the hole in the enclosure wall is provided with a bushing sealingly engaged with the wall and the bushing has a passageway containing a seal for forming a sealing arrangement with the draw bar shaft.

12. A method for instantaneously providing an emergency human passageway through the wall of an enclosure, including the steps of:
    cutting a small hole in a wall of the enclosure and inserting thereinto a draw bar,
    positioning an outer cutting means defining the size of the contemplated passageway adjacent the exterior wall of the enclosure with said draw bar extending at the center thereof,
    positioning an inner cutting means for cooperation with said outer cutting means on the draw bar adjacent the interior wall of the enclosure,
    providing power means capable of instantaneously forcibly drawing together said inner and outer cutters upon receipt of a given signal, and
    providing signal means for actuating the power source so as to instantaneously cut away a section of the enclosure wall.

13. The method of providing an emergency human passageway specified in claim 12, including:
    attaching the outer cutting means to a pivotal support assembly located adjacent the external wall whereby upon actuation of the power means the cutting means and cutout wall section will automatically swing outwardly of the enclosure providing a free passageway.

14. The method of providing an emergency human passageway specified in claim 12, including:
    emplacing a bushing having a passageway in the hole in the wall and providing a seal therearound and also sealing between the draw bar and passageway to maintain the enclosure sealed.

15. The method of providing an emergency human passageway specified in claim 12, including:
    providing signal means within the enclosure for actuating the power means and also providing external signal means for actuation of the power means by personnel outside the enclosure.

References Cited

UNITED STATES PATENTS

| | | | |
|---|---|---|---|
| 2,633,197 | 3/1953 | Nischan | 30—360 |
| 2,787,324 | 4/1957 | Hartmeister et al. | 30—360 |
| 3,128,543 | 4/1964 | Fasciano. | |
| 3,255,526 | 6/1966 | Molitor | 30—360 |
| 3,269,011 | 8/1966 | Herrstrum | 30—360 |

THOMAS H. EAGER, Primary Examiner

U.S. Cl. X.R.

29—200, 208; 30—360; 83—639, 657, 696